US012338376B2

(12) United States Patent
Okubo et al.

(10) Patent No.: US 12,338,376 B2
(45) Date of Patent: Jun. 24, 2025

(54) ADHESIVE, LAMINATED FILM, AND PRODUCTION METHOD FOR LAMINATED FILM

(71) Applicant: DIC Corporation, Tokyo (JP)

(72) Inventors: Tomoo Okubo, Sakura (JP); Shigekazu Takahashi, Tokyo (JP); Daiki Tomita, Tokyo (JP)

(73) Assignee: DIC CORPORATION, Tokyo (JP)

( * ) Notice: Subject to any disclaimer, the term of this patent is extended or adjusted under 35 U.S.C. 154(b) by 1312 days.

(21) Appl. No.: 16/982,721

(22) PCT Filed: Mar. 19, 2019

(86) PCT No.: PCT/JP2019/011390
§ 371 (c)(1),
(2) Date: Sep. 21, 2020

(87) PCT Pub. No.: WO2019/181921
PCT Pub. Date: Sep. 26, 2019

(65) Prior Publication Data
US 2021/0002530 A1   Jan. 7, 2021

(30) Foreign Application Priority Data
Mar. 23, 2018   (JP) ................................ 2018-056304

(51) Int. Cl.
| | | |
|---|---|---|
| *C09J 175/06* | (2006.01) | |
| *B32B 37/12* | (2006.01) | |
| *C08G 18/12* | (2006.01) | |
| *C08G 18/28* | (2006.01) | |
| *C08G 18/32* | (2006.01) | |
| *C08G 18/42* | (2006.01) | |
| *C08G 18/48* | (2006.01) | |
| *C08G 18/50* | (2006.01) | |
| *C08G 18/76* | (2006.01) | |
| *C09J 7/22* | (2018.01) | |
| *C09J 7/28* | (2018.01) | |
| *C09J 7/29* | (2018.01) | |
| *C09J 175/08* | (2006.01) | |
| *C09J 175/12* | (2006.01) | |

(52) U.S. Cl.
CPC ............ *C09J 175/06* (2013.01); *B32B 37/12* (2013.01); *C08G 18/12* (2013.01); *C08G 18/2855* (2013.01); *C08G 18/3206* (2013.01); *C08G 18/4202* (2013.01); *C08G 18/4833* (2013.01); *C08G 18/5045* (2013.01); *C08G 18/7657* (2013.01); *C09J 7/22* (2018.01); *C09J 7/28* (2018.01); *C09J 7/29* (2018.01); *C09J 175/08* (2013.01); *C09J 175/12* (2013.01); *C08G 2170/40* (2013.01); *C08G 2390/00* (2013.01); *C09J 2301/30* (2020.08); *C09J 2475/00* (2013.01)

(58) Field of Classification Search
CPC ....... C09J 175/06; C09J 175/08; C09J 175/04
See application file for complete search history.

(56) References Cited

U.S. PATENT DOCUMENTS

| | | | |
|---|---|---|---|
| 2011/0042002 A1* | 2/2011 | Blank | .................... C09J 175/04 428/323 |
| 2012/0190790 A1 | 7/2012 | Yamaguchi et al. | |
| 2016/0208146 A1 | 7/2016 | Arai et al. | |

FOREIGN PATENT DOCUMENTS

| | | | |
|---|---|---|---|
| CN | 105593301 A | | 5/2016 |
| JP | 60-252618 A | | 12/1985 |
| JP | 2003-171641 A | | 6/2003 |
| JP | 2003-171642 A | | 6/2003 |
| JP | 2003-171643 A | | 6/2003 |
| JP | 2004217860 A | * | 8/2004 |
| JP | 2006096785 A | * | 4/2006 |
| JP | 2007-16212 A | | 1/2007 |
| JP | 2014189639 A | * | 10/2014 |
| JP | 2016-074780 A | | 5/2016 |
| WO | 2011/030439 A1 | | 3/2011 |
| WO | 2017/196530 A1 | | 11/2017 |

OTHER PUBLICATIONS

JP 2006096785, machine translation (Year: 2006).*
International Search Report dated Jun. 11, 2019, issued in counterpart International Application No. PCT/JP2019/011390 with English translation (4 pages).
Written Opinion in Japanese dated Jun. 11, 2019, issued in counterpart International Application No. PCT/JP2019/011390 (5 pages).
Notice of Reasons for Refusal dated Jan. 7, 2020, issued in counterpart JP Patent Application No. 2019-553140, w/English translation (8 pages).
Notice of Reasons for Refusal dated Mar. 31, 2020, issued in counterpart JP Patent Application No. 2019-553140, w/English translation (4 pages).

(Continued)

*Primary Examiner* — Alex B Efta
(74) *Attorney, Agent, or Firm* — WHDA, LLP

(57) ABSTRACT

Provided are an adhesive including a polyisocyanate composition (X) containing a polyisocyanate (A), and a polyol composition (Y) containing a tertiary amine compound (B) having plural hydroxyl groups, a polyol (C), and an aliphatic cyclic amide compound (D), as essential components, a laminated film using the adhesive, and a method for producing a laminated film including a step of separately applying two components, which includes bringing a polyisocyanate composition (X) containing a polyisocyanate (A) that is applied onto one base material into contact with a polyol composition (Y) containing a tertiary amine compound (B) having plural hydroxyl groups, a polyol (C), and an aliphatic cyclic amide compound (D) that is applied onto the other base material, and performing pressure-bonding.

5 Claims, No Drawings

(56) References Cited

OTHER PUBLICATIONS

Extended (Supplementary) European Search Report dated Nov. 18, 2021, issued in counterpart EP Application No. 19770586.6. (9 pages).

* cited by examiner

ADHESIVE, LAMINATED FILM, AND PRODUCTION METHOD FOR LAMINATED FILM

TECHNICAL FIELD

The present invention relates to a two-component type adhesive, and a laminated film prepared by laminating various films using the adhesive. More specifically, the present invention relates to an adhesive for lamination that can be used under the solvent-free condition and used in a case where various plastic films, metal deposition films, aluminum foils, and the like are laminated for producing laminated films mainly used for packaging materials for food, pharmaceuticals, detergents, and the like.

BACKGROUND ART

Polyurethane resin is widely used as a lamination adhesive for flexible packaging materials in terms of its excellent adhesiveness to base materials and flexibility, and a laminated film prepared by lamination with the urethane resin-based adhesive prepared from the reaction of a polyisocyanate and a polyol is used as a packaging material for food, pharmaceuticals, detergents and the like.

Conventionally, a dry lamination method of applying an adhesive dissolved in an organic solvent onto a film, passing the film through an oven to volatilize the organic solvent, and laminating another film on the film has become a predominated technology in the art. However, from the viewpoint of reducing an environmental load and improving working environment, the demand for two-component type solvent-free lamination adhesives (hereinafter, also referred to as two-component type adhesives or reactive adhesives), which are free of an organic solvent, has gradually increased in recent years.

With respect to the two-component type solvent-free lamination adhesive, it is necessary to perform an aging step for promoting the reaction of a polyisocyanate composition and a polyol composition after lamination. Although an aging temperature and aging time are varied depending on the adhesive to be used in the step, the aging step is usually carried out for 1 to 5 days at 25° C. to 50° C. Therefore, it is desired to shorten the aging time without heating (around 25° C.).

For a method for enabling aging for a short period of time at around 25° C. without heating, the use of an amine catalyst is known. However, the amine catalyst itself is highly reactive with polyisocyanate and forms a low molecular weight three-dimensional crosslinked product in the adhesive coating film. This tends to weaken the adhesive coating film and deteriorate the heat seal strength and the lamination strength.

As a method for exhibiting heat seal strength and lamination strength of the solvent-free lamination adhesive with aging for a short period of time at around 25° C. without heating, a two-component separate coating type urethane-based adhesive is known (for example, refer to PTL 1), which combines a solvent-free type component A liquid at normal temperature including a compound having an iso-cyanate group on both terminals of the molecule as a main component and a solvent-free component B liquid at normal temperature including a compound having an amino group on both terminals of the molecule as a main component in combination. Further, an adhesive in which a compound having a tertiary amine in the molecule and a tackifying resin are further included in the solvent-free component B (for example, refer to PTL 2), and an adhesive in which a compound having a hydroxyl group in the molecule is used as a main component and further a tertiary amine compound and/or an organo-tin compound is used for the solvent-free component B (for example, refer to PTL 3) are known.

However, the above methods each has a problem that desired heat seal strength and lamination strength cannot be obtained with aging for a short period of time at around 25° C. without heating.

CITATION LIST

Patent Literature

PTL 1: JP-A-2003-171641
PTL 2: JP-A-2003-171642
PTL 3: JP-A-2003-171643

SUMMARY OF INVENTION

Technical Problem

An object of the present invention is to provide a solvent-free two-component type adhesive capable of exhibiting excellent heat seal strength and lamination strength with aging for a short period of time at a low temperature.

Solution to Problem

As a result of intensive studies, the present inventors have found that a solvent-free two-component type adhesive including a polyisocyanate composition (X) containing a polyisocyanate (A), and a polyol composition (Y) containing a tertiary amine compound (B) having plural hydroxyl groups, a polyol (C), and an aliphatic cyclic amide compound (D), as essential components, exhibits excellent heat seal strength and lamination strength with aging for a short period of time at around 25° C., and thus have completed the present invention.

That is, the present invention provides an adhesive including a polyisocyanate composition (X) containing a polyisocyanate (A), and a polyol composition (Y) containing a tertiary amine compound (B) having plural hydroxyl groups, a polyol (C), and an aliphatic cyclic amide compound (D), as essential components.

The present invention also provides a laminated film having an adhesive cured between a first base film and a second base film, in which the adhesive is the above-described adhesive.

The present invention also provides a method for producing a laminated film in which the adhesive is applied on a base material, the method including a step of separately applying two components, which includes bringing a polyisocyanate composition (X) containing a polyisocyanate (A) that is applied onto one base material into contact with a polyol composition (Y) containing a tertiary amine compound (B) having plural hydroxyl groups, a polyol (C), and an aliphatic cyclic amide compound (D) that is applied onto the other base material and performing pressure-bonding.

Since the solvent-free two-component type adhesive of the present invention exhibits excellent heat seal strength and lamination strength with aging for a short period of time at around 25° C., a laminated film using the adhesive exhibits excellent productivity.

DESCRIPTION OF EMBODIMENTS (Adhesive)

An adhesive of the present invention includes a polyisocyanate composition (X) containing a polyisocyanate (A), and a polyol composition (Y) containing a tertiary amine compound (B) having plural hydroxyl groups, a polyol (C), and an aliphatic cyclic amide compound (D) as essential components.

(Polyisocyanate (A))

The polyisocyanate (A) used in the present invention may be any known substance without particular limitation. Examples thereof include polyisocyanates having an aromatic structure in the molecular structure, such as tolylene diisocyanate, 2,4'-diphenylmethane diisocyanate (hereinafter, sometimes referred to as MDI), 2,2'-MDI, 4,4'-MDI, 1,5-naphthalene diisocyanate, triphenylmethane triisocyanate and xylylene diisocyanate; compounds obtained by modifying a moiety of the NCO group of these polyisocyanates with carbodiimides; allophanate compounds derived from these polyisocyanates; polyisocyanates having an alicyclic structure in the molecular structure, such as isophorone diisocyanate, 4,4'-methylenebis(cyclohexyl isocyanate) and 1,3-(isocyanatomethyl)cyclohexane; linear aliphatic polyisocyanates such as 1,6-hexamethylene diisocyanate, lysine diisocyanate and trimethylhexamethylene diisocyanate, and allophanate compounds thereof; isocyanurate products of these polyisocyanates; allophanate products derived from these polyisocyanates; biuret products derived from these polyisocyanates; adduct products obtained by modifying with trimethylolpropane; and polyisocyanates as reaction products of the various polyisocyanates and polyol components.

Moreover, particularly in the present invention, by reacting the linear aliphatic polyisocyanate, along with the polyisocyanate having an aromatic structure in the molecular structure, with a polyol component, flexibility can be imparted to a laminate to improve practical packaging properties, and thus such a reaction product is preferable from this viewpoint. In this case, when the linear aliphatic polyisocyanate reacts with the hydroxyl group of the polyol component, a urethane bond or an allophanate bond is formed and introduced into the polyisocyanate (A). In a case where the polyisocyanate having an aromatic structure and the linear aliphatic polyisocyanate are used in combination, the ratio thereof used is preferably 99/1 to 70/30 by mass [(polyisocyanate having an aromatic structure/linear aliphatic polyisocyanate], from the viewpoint of low viscosity.

Particularly, from the viewpoint of being capable of carrying out aging for a short period of time at around 25° C., the ratio of 4,4'-MDI with respect to the isocyanate monomer used as a raw material during the production of polyisocyanate is preferably 38% or more based on all the raw materials.

Here, a reaction ratio of the polyisocyanate to the polyol component is preferably in such a range that the equivalence ratio of the isocyanate group to the hydroxyl group of the polyol component [isocyanate group/hydroxyl group] is 1.5 to 5.0 from the viewpoint of improving coating properties due to the viscosity of the adhesive in an appropriate range or cohesion of the adhesive coating film.

Specific examples of the polyol component which reacts with the polyisocyanate having an alicyclic or aromatic structure in the molecular structure include chain aliphatic glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutadiol, butyl ethyl propanediol, diethylene glycol, triethylene glycol, tetraethylene glycol, dipropylene glycol, tripropylene glycol and bis(hydroxyethoxy)benzene; alicyclic glycols such as 1,4-cyclohexanediol and 1,4-cyclohexanedimethanol; trifunctional or tetrafunctional aliphatic alcohols such as glycerin, trimethylolpropane and pentaerythritol; bisphenols such as bisphenol A, bisphenol F, hydrogenated bisphenol A and hydrogenated bisphenol F; dimerdiol; polyether polyol obtained by subjecting, in the presence of a polymerization initiator such as the glycols, and trifunctional or tetrafunctional aliphatic alcohols, an alkylene oxide such as ethyleneoxide, propyleneoxide, butyleneoxide, styreneoxide, epichlorohydrin, tetrahydrofuran, and cyclohexylene to addition polymerization; polyester polyol (1) as a reaction product of a polyester obtained by a ring-opening polymerization reaction of cyclic ester compounds such as propiolactone, butyrolactone, ε-caprolactone, σ-valerolactone and β-methyl-σ-valerolactone, and the glycol or trifunctional or tetrafunctional aliphatic alcohol; polyester polyol (2) obtained by reacting a polycarboxylic acid with a polyol such as the chain aliphatic glycol, alicyclic glycol, dimerdiol, bisphenol or the polyether polyol; polyester polyol (3) obtained by reacting the trifunctional or tetrafunctional aliphatic alcohol with a polycarboxylic acid; polyester polyol (4) obtained by reacting the bifunctional polyol, trifunctional or tetrafunctional aliphatic alcohol with a polycarboxylic acid; polyester polyol (5) as a polymer of hydroxy acids such as dimethylol propionic acids and castor oil fatty acids; a mixture of the polyester polyol (1), (2), (3), (4), or (5) and a polyether polyol; and a castor oil-based polyol such as castor oil, dehydrated castor oil, a hydride of castor oil as a hydrogenated castor oil, and an alkylene oxide adduct (5 to 50 mol) of castor oil.

Here, examples of the polycarboxylic acid used in the process of producing the polyester polyol (2), (3) or (4) include noncyclic aliphatic dicarboxylic acids such as succinic acid, adipic acid, azelaic acid, sebacic acid, dodecanedioic acid, maleic anhydride and fumaric acid; alicyclic dicarboxylic acids such as 1,3-cyclopentanedicarboxylic acid and 1,4-cyclohexanedicarboxylic acid; aromatic dicarboxylic acids such as terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyl dicarboxylic acid and 1,2-bis(phenoxy)ethane-p,p'-dicarboxylic acid; anhydrides or ester-forming derivatives of these aliphatic or aromatic dicarboxylic acids; p-hydroxybenzoic acid, p-(2-hydroxyethoxy)benzoic acid and ester-forming derivatives of these dihydroxycarboxylic acids, and polybasic acids such as dimer acids.

Among these polyol components, particularly, a polyisocyanate obtained by reacting the polyisocyanate with the polyether polyol as a essential component is preferable from the viewpoint of the wettability.

The weight average molecular weight (Mw) of the polyisocyanate (A) is preferably in a range of 3,000 to 10,000, from the viewpoint of ensuring suitable practical packaging properties while shortening the aging time, and more preferably in a range of 500 to 5,000.

In addition, from the viewpoint of suitable resin viscosity and excellent coating properties, it is preferable that the content of isocyanates is 5% to 20% by mass as measured by titration (with di-n-butylamine)

(Polyol Composition (Y): Tertiary Amine Compound (B) Having Plural Hydroxyl Groups)

In the present invention, the polyol composition (Y) contains a tertiary amine compound (B) having plural hydroxyl groups, a polyol (C), and an aliphatic cyclic amide compound (D).

The tertiary amine compound (B) having plural hydroxyl groups is required to have two or more hydroxyl groups, and preferably 2 to 6 hydroxyl groups. In addition, the tertiary amine compound may have one or more tertiary amino groups, and preferably has one or two tertiary amino groups.

Specifically, examples of the tertiary amine compound (B) having plural hydroxyl groups include polypropylene glycol ethylenediamine ether, tri(1,2-polypropylene glycol) amine, N-ethyldiethanolamine, N-methyl-N-hydroxyethyl-N-hydroxyethoxyethylamine, pentakis-hydroxypropyl diethylenetriamine, tetrakis-hydroxypropyl ethylenediamine, and N,N,N',N'-tetrakis(2-hydroxypropyl)ethylenediamine.

A commercially available product may be used as the tertiary amine compound (B) having plural hydroxyl groups. Examples of commercially available products include EDP300 manufactured by ADEKA CORPORATION, and ED-500 and TE-360 manufactured by KUKDO Chemical Co., Ltd.

The polyol (C) and the tertiary amine compound (B) having plural hydroxyl groups are mixed such that the mixing ratio of the polyol (C) and the tertiary amine compound (B) having plural hydroxyl groups is preferably a mass ratio [(C)/(B)] of 100/5 to 100/70 and more preferably a mass ratio of 100/10 to 100/70. Within this range, an adhesive having faster curability can be obtained.

In the present invention, it is not clear why the curability becomes faster by using the polyol composition (Y) containing the polyol (C) and the tertiary amine compound (B) having plural hydroxyl groups, but it is presumed as follows.

A tertiary amine having plural hydroxyl groups can usually become a self-catalytic polyol. It is presumed that since a structure in which tertiary amine is adjacent to hydroxyl groups is formed, the catalysis more significantly acts. Thus, it is presumed that the curability becomes faster.

In the present invention, the hydroxyl groups of the tertiary amine compound (B) are preferably secondary hydroxyl groups or tertiary hydroxyl groups. In the case where the hydroxyl groups are secondary or tertiary, it is easy to maintain the usable time (pot life) after the mixing of the two components, and in a step of separately applying the two components, the mixing of the pressure-bonded polyisocyanate composition (X) and polyol composition (Y) is not inhibited.

(Polyol Composition (Y): Polyol (C))

Examples of the polyol (C) used in the present invention include glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butyl ethyl propanediol, diethylene glycol, triethylene glycol, tetraethyleneglycol, dipropyleneglycol, tripropyleneglycol, bis(hydroxyethoxy) benzene, 1,4-cyclohexanediol, 1,4-cyclohexanedimethanol, and triethylene glycol; trifunctional or tetrafunctional aliphatic alcohols such as glycerin, trimethylolpropane and pentaerythritol; bisphenols such as bisphenol A, bisphenol F, hydrogenated bisphenol A and hydrogenated bisphenol F; dimerdiol; polyether polyol obtained by subjecting, in the presence of a polymerization initiator, such as the glycols, and trifunctional or tetrafunctional aliphatic alcohols, an alkylene epoxide such as ethylene oxide, propylene oxide, butylene oxide, styrene oxide, epichlorohydrin, tetrahydrofuran and cyclohexylene, to addition polymerization; polyether urethane polyol obtained by further increasing the molecular weight of the polyether polyol with the aromatic or aliphatic polyisocyanate; polyester polyol (1) as a reaction product of a polyester obtained by a ring-opening polymerization reaction of cyclic ester compounds such as propiolactone, butyrolactone, ε-caprolactone, σ-valerolactone and β-methyl-σ-valerolactone and polyols such as the glycol, glycerin, trimethylolpropane and pentaerythritol; polyester polyol (2) obtained by reacting a polycarboxylic acid with a bifunctional polyol such as the glycol, dimerdiol or the bisphenol;

polyester polyol (3) obtained by reacting the trifunctional or tetrafunctional aliphatic alcohol with a polycarboxylic acid; polyester polyol (4) obtained by reacting the bifunctional polyol, trifunctional or tetrafunctional aliphatic alcohol with a polycarboxylic acid; polyester polyol (5) as a polymer of hydroxy acids such as dimethylol propionic acid and castor oil fatty acid; polyester polyether polyol obtained by reacting the polyester polyols (1) to (5) with the polyether polyol and aromatic or aliphatic polyisocyanate; polyester urethane polyols obtained by increasing the molecular weight of the polyester polyols (1) to (5) with the aromatic or aliphatic polyisocyanate; a mixture of the polyester polyols (1) to (5) and a polyether polyol; and a castor oil-based polyol such as castor oil, dehydrated castor oil, a hydride of castor oil as hydrogenated castor oil, and an alkylene oxide adduct (5 to 50 mol) of castor oil. The weight average molecular weight (Mw) of the polyol (C) used is preferably 400 to 5000.

Examples of the polycarboxylic acid here include, aliphatic dicarboxylic acids such as succinic acid, adipic acid, azelaic acid, sebacic acid, dodecanedioic acid, maleic anhydride, fumaric acid, 1,3-cyclopentanedicarboxylic acid and 1,4-cyclohexanedicarboxylic acid; aromatic dicarboxylic acids such as terephthalic acid, isophthalic acid, 1,4-naphthalenedicarboxylic acid, 2,5-naphthalenedicarboxylic acid, 2,6-naphthalenedicarboxylic acid, naphthalic acid, biphenyl dicarboxylic acid and 1,2-bis(phenoxy)ethane-p,p'-dicarboxylic acid; and anhydrides or ester-forming derivatives of these aliphatic or aromatic dicarboxylic acids; p-hydroxybenzoic acid, p-(2-hydroxyethoxy)benzoic acid and ester-forming derivatives of these dihydroxycarboxylic acids, and polybasic acids such as dimer acids.

(Polyol Composition (Y): Aliphatic Cyclic Amide Compound (D))

Examples of the aliphatic cyclic amide compound (D) include δ-valerolactam, ε-caprolactam, ω-enanthollactam, η-capryllactam, and β-propiolactam. Among these, ε-caprolactam is preferable from the viewpoint of being excellent in the effect of reducing the elution amount of a low molecular chemical substance. It is preferable that the amount of the aliphatic cyclic amide compound to be mixed is in a range of 0.1 to 5.5 parts by mass with respect to 100 parts by mass of the polyol (C). In addition, it is preferable to mix the aliphatic cyclic amide compound in a range of 0.1 to 5 parts by mass with respect to 100 parts by mass of the polyol composition (Y).

Examples of the aliphatic cyclic amide compound (D) used herein include δ-valerolactam, ε-caprolactam, ω-enanthollactam, η-capryllactam, and β-propiolactam. Among these, ε-caprolactam is preferable from the viewpoint of being excellent in the effect of reducing the elution amount of a low molecular chemical substance. In addition, it is preferable that the amount of the aliphatic cyclic amide compound to be mixed is in a range of 0.1 to 5.5 parts by mass with respect to 100 parts by mass of the polyol (C). Further, it is preferable that the amount of the aliphatic cyclic amide compound (D) to be mixed is in a range of 0.1 to 5 parts by mass with respect to 100 parts by mass of the polyol composition (Y).
(Amine Value)

In the adhesive of the present invention, an amine value contained in the adhesive is preferably in a range of 0.5 to 40 mgKOH/g.

The amine value used herein means the number of milligrams of KOH which is equivalent to the amount of HCl required to neutralize 1 g of a sample, which can be calculated by known methods without particular limitation. Specifically, for example, the following methods are preferable.

In a case where the chemical structure of the amine compound, and as required, the average molecular weight and the like are known, the amine value can be calculated from the following calculation expression.

$$\text{Amine value (mgKOH/g)} = (\text{number of amino groups in per molecule/average molecular weight}) \times 56.1 \times 1000$$

In a case where the chemical structure, the average molecular weight, and the like of the amine compound are unknown, the amine value may be measured by known measuring methods. For example, as the method for measuring an amine value, a method for measuring an amine value according to JIS-K7237-1995 may be used.

When the amine value is within this range, more excellent curability can be obtained while ensuring the practical packaging properties. The amine value is preferably in a range of 1.5 to 35 mgKOH/g, and more preferably in a range of 1.5 to 25 mgKOH/g.
(Solvent)

The adhesive of the present invention is an adhesive that is cured by a chemical reaction between an isocyanate group and a hydroxyl group, and can be used in the form of a solvent-free adhesive. The "solvent" of the solvent-free adhesive according to the present invention refers to an organic solvent with high solubility capable of dissolving the polyisocyanate (A) and the polyol (C) used in the present invention, and the term "solvent-free" refers to be free of the organic solvent with high solubility. Examples of the organic solvent with high solubility include toluene, xylene, methylene chloride, tetrahydrofuran, methanol, ethanol, isopropyl alcohol, methyl acetate, ethyl acetate, n-butyl acetate, acetone, methyl ethyl ketone (MEK), cyclohexanone, toluoyl, xylol, n-hexane, and cyclohexane. Among these, toluene, xylene, methylene chloride, tetrahydrofuran, methyl acetate, and ethyl acetate are known as organic solvents with particularly high solubility.

On the other hand, in a case where a low viscosity or the like is required, the adhesive of the present invention can be used by being suitably diluted with the organic solvent with high solubility according to the desired viscosity. In that case, either or both of the polyisocyanate composition (X) or the polyol composition (Y) may be diluted. Examples of the organic solvent used in this case include, methanol, ethanol, isopropyl alcohol, methyl acetate, ethyl acetate, n-butyl acetate, acetone, methyl ethyl ketone (MEK), cyclohexanone, toluyl, xylol, n-hexane, and cyclohexane. Among these, from the viewpoint of solubility, ethyl acetate and methyl ethyl ketone (MEK) are preferable and ethyl acetate is particularly preferable. Although the amount of the organic solvent used depends on the required viscosity, the organic solvent is often used in a range of approximately 20% to 50% by mass.

In the adhesive of the present invention, regarding the mixing ratio of the polyisocyanate composition (X) and the polyol composition (Y), the equivalence ratio [isocyanate group/hydroxyl group] of the isocyanate group in the polyisocyanate (A) and the hydroxyl group in the polyol (C) is preferably in a range of 0.6 to 5.0 from the viewpoint of excellent bonding strength and heat resistance during heat sealing, and particularly preferably in a range of 1.0 to 3.5 from the viewpoint that these properties become remarkable.

The adhesive of the present invention may be used in combination with a pigment as required. In this case, the pigment that can be used is not particularly limited, and examples thereof include those listed in Handbook of Paint Raw Materials of 1970 edition (compiled by Japan Paint Manufacturers Association), including organic and/or inorganic pigments such as extender pigments, white pigments, black pigments, gray pigments, red pigments, brown pigments, green pigments, blue pigments, metal powder pigments, luminous pigments, and pearl pigments, and further plastic pigments. As specific examples of these colorants, various substances are described. Examples of organic pigments include various insoluble azo pigments such as Benzidine Yellow, Hansa Yellow and Lake Red 4R; soluble azo pigments such as Lake Red C, Carmine 6B and Bordeaux 10; various (copper) phthalocyanine-based pigments such as Phthalocyanine Blue and Phthalocyanine Green; various basic dyeing lakes such as Rhodamine Lake and Methyl Violet Lake; various mordant dye-based pigments such as Quinoline Lake and Fast Sky Blue; various vat dye-based pigments such as anthraquinone-based pigments, thioindigo-based pigments and perionone-based pigments; various quinacridone-based pigments such as Cinquasia Red B; various dioxazine-based pigments such as Dioxazine Violet; various condensed azo pigments such as Cromophtal; and Aniline Black.

Examples of the inorganic pigments include various chromates such as chrome yellow, zinc chromate and Molybdate Orange; various ferrocyanides such as iron blue; various metal oxides such as titanium oxide, zinc white, Mapico Yellow, iron oxide, red iron oxide, chromium oxide green and zirconium oxide; various sulfides such as cadmium yellow, cadmium red and mercuric sulfide, and selenides; various sulfates such as barium sulfate and lead sulfate; various silicates such as calcium silicate and ultramarine; various carbonates such as calcium carbonate and magnesium carbonate; various phosphates such as cobalt violet and manganese violet; various metal powder pigments such as aluminum powder, gold powder, silver powder, copper powder, bronze powder and brass powder; flake pigments and mica flake pigments of these metals; metal pigments and/or pearl pigments such as mica flake pigments covered with metal oxides and micaceous iron oxide pigments; graphite, and carbon black.

Examples of the extender pigments include precipitated barium sulfates, Paris white (gofun), precipitated calcium carbonates, calcium bicarbonates, white marble, alumina white, silica, hydrated fine silica (white carbon), superfine anhydrous silica powder (fumed silica), quartz sand (silica sand), talc, precipitated magnesium carbonates, bentonites, clay, kaolin, and loess.

Further, examples of the plastic pigment include "GRANDOLL PP-1000" and "PP-2000S" manufactured by DIC corporation.

The pigments used in the present invention are more preferably inorganic oxides, such as titanium oxide and zinc white, as a white pigment, and carbon black as a black pigment from the viewpoint of excellent durability, weather resistance and designability.

The mass ratio of the pigment used in the present invention is preferably 1 to 400 parts by mass and more preferably 10 to 300 parts by mass with respect to a total of 100 parts by mass of the polyisocyanate composition (X) and the polyol (C) from the viewpoint of excellent adhesion, blocking resistance, and the like.

An adhesion promoter can be used in the adhesive of the present invention. Examples of the adhesion promoter include coupling agents such as silane coupling agents, titanate-based coupling agents and aluminum-based coupling agents, and epoxy resins.

Examples of the silane coupling agents include, amino silanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxy silane and N-phenyl-γ-aminopropyltrimethoxysilane; epoxy silanes such as β-(3,4-epoxycyclohexyl)ethyltrimethoxysilane, γ-glycidoxypropyltrimethoxysilane and γ-glycidoxypropyltriethoxysilane; vinyl silanes such as vinyltris(β-methoxyethoxy)silane, vinyltriethoxysilane, vinyltrimethoxysilane and γ-methacryloxypropyltrimethoxysilane; and hexamethyldisilazane and γ-mercaptopropyltrimethoxysilane.

Examples of the titanate-based coupling agents include tetraisopropoxytitanium, tetra-n-butoxytitanium, butyl titanate dimer, tetrastearyl titanate, titanium acetylacetonate, titanium lactate, tetraoctylene glycol titanate, titanium lactate, and tetrastearoxytitanium.

Examples of the aluminum-based coupling agent include acetoalkoxy aluminum diisopropylate and the like.

Examples of the epoxy resin may include various commercially available epoxy resins of epi-bis type, novolac type, β-methyl epichlo type, cyclic oxirane type, glycidyl ether type, glycidyl ester type, polyglycol ether type, glycol ether type, epoxidized fatty acid ester type, polycarboxylic acid ester type, aminoglycidyl type, and resorcine type.

As required, the adhesive of the present invention may also contain additives other than those described above. Examples of the additives may include leveling agents; inorganic fine particles such as colloidal silica and alumina sol; polymethyl methacrylate-based organic fine particles; defoamers; anti-sagging agents; wetting and dispersing agents; viscosity modifiers; ultraviolet absorbers; metal deactivators; peroxide decomposers; flame retardants; reinforcing agents; plasticizers; lubricants; antirust agents; fluorescent brighteners; inorganic heat ray absorbers; fire retardants; antistatic agents; and dehydrating agents.

These pigments, adhesion promoters, and additives can be mixed with either one of the polyisocyanate composition (X) and the polyol composition (Y), or can be mixed and used as a third component at the time of coating.

(Production Method)

The laminated film of the present invention can be obtained by a known method. For example, a method for obtaining the laminated film by applying a polyisocyanate composition (X) containing a polyisocyanate (A) and a polyol composition (Y) containing a polyol composition (Y) containing a tertiary amine compound (B) having plural hydroxyl groups, a polyol (C), and an aliphatic cyclic amide compound (D), which have been mixed in advance, as the adhesive of the present invention, onto a first plastic film, then laminating a second plastic film on the coated surface, and curing the adhesive layer (production method 1); a method for obtaining a laminated film by a step of separately applying two components in which the polyisocyanate composition (X) and the polyol composition (Y) are respectively applied onto a first plastic film and a second plastic film, the coated surfaces are then brought into contact with each other and pressure-bonded so that the first plastic film and the second plastic film are laminated, and the adhesive layer is cured (production method 2) may be used.

In the present invention, in a case of employing the production method 2, that is, a method having a step of separately applying two components (also referred to as separate coating), which includes bringing a polyisocyanate composition (X) containing a polyisocyanate (A), which is applied onto one base material, into contact with a polyol composition (Y) containing a polyol composition (Y) containing a tertiary amine compound (B) having plural hydroxyl groups, a polyol (C), and an aliphatic cyclic amide compound (D), which is applied onto the other base material, and performing pressure-bonding, the excellent curability as an effect of the adhesive of the present invention can be maximized, and thus this case is preferable.

(Production Method 1)

Examples of the production method 1 include a method including applying the adhesive of the present invention formed by pre-mixing the polyisocyanate composition (X) with the polyol composition (Y) onto a first plastic film, for example, by a roll coater coating method, followed by adhering the film to the other base material without a drying step.

Any coating conditions are available as long as the conditions are compatible with the coating equipment. However, in terms of a conventional roll coater, it is preferable that the coating is carried out in the conditions of heating to about 25° C. to about 120° C. and setting a viscosity of the adhesive of the present invention as 2500 mPa·s or less. A preferable viscosity range is 2000 mPa·s or less. The coating amount is preferably 0.5 to 5.0 g/m$^2$, and more preferably about 1.0 to 4.0 g/m$^2$.

(Production Method 2)

As an example of the production method 2, that is, so-called separate coating, in the adhesive of the present invention, the polyisocyanate composition (X) and the polyol composition (Y) are separately applied onto a first plastic film and a second plastic film. At this time, for example, in a case where the polyisocyanate composition (X) is applied onto the first plastic film, the polyol composition (Y) is applied onto the second plastic film, and vice versa. Next, two base materials are adhered to allow component A and component B to be in contact with each other and pressure-bonded to initiate the reaction so that curing proceeds rapidly. Also, the mixing of two components is not required as in the conventional two-component mixed type adhesive, and thus it is not necessary to worry about the usable time (pot life) after the mixing of the two components. Thus, excellent workability can be attained. The pressure bonding method is preferably an adhering method by dry lamination (dry lamination method), the temperature of the laminating roll is preferably room temperature to about 120° C., and the pressure is preferably about 3 to 300 kg/cm$^2$. In this way, a flexible packaging film can be obtained.

In the case of the separate coating, it is desired that coating is performed at a lower viscosity so as to more efficiently conduct the mixing of the layers of the polyisocyanate composition (X) and polyol composition (Y) after adhesion. Specifically, it is preferable that the coating is performed at a viscosity of 1000 mPa·S or less. In addition, the coating amounts of the polyisocyanate composition (X) and the polyol composition (Y) are each preferably 0.5 to 3.0 g/m², and more preferably about 0.5 to 2.0 g/m².

In any of the methods, in a case where the adhesive of the present invention is used, the adhesive is cured for 3 to 24 hours at normal temperature or under heating after lamination, and exhibits practical physical properties.

Examples of the first plastic film used herein include base films such as polyethylene terephthalate (PET) films, nylon films (hereinafter, abbreviated as "OPA films"), biaxially oriented polypropylene (OPP) films, various vapor deposition films, and aluminum foils. Examples of the other base material include sealant films such as cast polypropylene (CPP) films and linear low density polyethylene (LLDPE) films.

The laminated film thus obtained can be industrially used as packaging materials for filling detergents and chemicals such as flexible packaging films and flexible packaging materials (packaging in which the shape of the packaging is formed by containing the contents). Examples of the detergents and chemicals in specific usage may include laundry liquid detergents, kitchen liquid detergents, bath liquid detergents, bath liquid soaps, liquid shampoos, and liquid conditioners.

The packaging material produced by using the adhesive of the present invention eliminates peeling, such as delamination, of the laminate structure and has excellent adhesion and content resistance when the package is filled with the content, such as a detergent and a chemical, and even after a passage of time after filling.

EXAMPLES (Production Example 1 [Synthesis of Polyisocyanate (A-1)])

In a flask equipped with a stirrer, a thermometer, and a nitrogen gas introducing pipe, 36.5 parts of 4,4-MDI and 1 part of the hexamethylene diisocyanurate were put into the reaction vessel, stirred under a nitrogen gas atmosphere, and heated to 60° C. 4.3 parts of trifunctional propylene glycol having a number average molecular weight of 430 (EXCENOL 430 manufactured by AGC Inc.) and 53.2 parts of bifunctional propylene glycol having a number average molecular weight of 2000 (ACTOCOL D-2000 manufactured by Mitsui Chemicals Polyurethanes Co., Ltd.) were added dropwise in several portions, and stirred for 5-6 hours, and thus, the urethanization reaction was terminated.

Next, 5.0 parts of polymeric MDI (product name: LUPRANATE M20S manufactured by BASF INOAC Polyurethanes Ltd.) was put into the reaction vessel. The obtained polyisocyanate contained an NCO group in an amount of 10.5% and had a melt viscosity of 1500 mPa·s at 40° C. Hereinafter, this polyisocyanate is abbreviated as "A-1".

Since the polymeric MDI used includes cyclic MDI and 4,4-MDI at a ratio of 60/40, the ratio of 4,4-MDI contained in "A-1" is 38.5%.

Examples 1 to 4 and Comparative Examples 1 to 2

"A-1" was used for the polyisocyanate composition. For the polyol composition, B1 to B6 prepared according to the formulations in Table 1 were used. The evaluation results are shown in Table 2. The following various evaluations were performed.

(Method for Producing Laminated Film)

As the method for producing the laminated film, production method (1) and production method (2) were employed.

(Production Method 1)

After the polyisocyanate composition (X) and the polyol composition (Y) prepared according to the formulations shown in Table 2 were mixed to obtain an adhesive, the prepared adhesive was applied onto film A in such a coating amount that the solid content was about 2.0 g/m², and the coated surface of the film A was adhered to film B with a laminator, thereby preparing a laminated film for measuring heat seal strength and lamination strength.

(Production Method 2)

The polyisocyanate composition (X) and the polyol composition (Y) were each prepared according to the formulations shown in Table 2, and the polyisocyanate composition (X) and the polyol composition (Y) were applied onto film A and film B, respectively. Thereafter, the coated surfaces of film A and film B were pressure-bonded such that the coated surfaces of film A and film B faced each other with a nip roll (nip roll temperature: 50° C.) to produce a plastic film laminate. The coating amount of each of the polyisocyanate composition (X) and the polyol composition (Y) was set to 2.0 g/m² in total according to the mass ratio of the polyisocyanate composition (X) and the polyol composition (Y) described in Tables 1 and 2. The processing speed was 30 m/min.

(Evaluation Method)

(Heat Seal Strength)

A nylon film (hereinafter, abbreviated as OPA film) was used as film A, and a linear low density polyethylene film (hereinafter, abbreviated as LLDPE film) was used as film B. Laminated films for measuring heat seal strength were prepared according to the production method (1) and the production method (2). The prepared laminated film was pressed using a heat seal bar having a width of 1 cm from the OPA film side with the LLDPE surfaces facing each other and melt-bonded. As the heat sealing conditions at that time, the heat sealing was performed at 180 degrees and 0.1 bar for 1 second. The heat-sealed portion was cut into a width of 15 mm and the heat seal strength was measured. The measurement was performed at a speed of 300 mm/min. The unit of heat seal strength is N/15 mm. The aging temperature was 25 degrees. To compare how much the aging time is shortened, laminated films were prepared to evaluate heat seal strength after 1, 3, 5, and 24 hours. The evaluation was carried out based on the following five-level evaluation.

5: 50 or greater
4: 40 to 49
3: 30 to 39
2: 20 to 29
1: 0 to 19

(Lamination Strength)

Similar to the heat seal strength evaluation, the laminate strength of the laminate of the OPA film and the LLDPE film was evaluated. Evaluation was performed by T-type peeling at a speed of 300 mm/min. The unit of measurement of the lamination strength is N/15 mm. The lamination strength after 1, 3, 5, and 24 hours was evaluated based on the following five-level evaluation.

5: 3 or greater
4: 2.1 to 3.0
3: 1.1 to 2.0
2: 0.5 to 1.0
1: 0.5 or less

TABLE 1

| Table 1 | | Examples 1 to 4 | | | | Comparative Examples 1 and 2 | |
|---|---|---|---|---|---|---|---|
| | | B-1 | B-2 | B-3 | B-4 | B-5 | B-6 |
| Polyol (C) | Castor oil | 73.3 | | | | | |
| | PPG-2000 | | 68.8 | | 82.4 | 100.0 | |
| | PPG-1000 | 18.3 | | 18.2 | | | 93.7 |
| Tertiary amine compound (B) having plurality of hydroxyl groups (B) | EDP300 | 6.6 | | | | | |
| | TE-360 | | 30.9 | 76.8 | | | |
| | ED-500 | | | | 15.1 | | |
| Tertiary amine compound | TEA | | | | | | |
| | DEA | | | | | | 6.3 |
| Aliphatic cyclic amide compound (D) | ε-caprolactam | 0.9 | 0.30 | | | | |
| | δ-valerolactam | | | 5.0 | | | |
| | β-propiolactone | | | | 2.5 | | |
| Additive | OFS-6040 | 0.6 | | | | | |
| | KBM-903 | 0.3 | | | | | |
| Total | | 100.0 | 100.0 | 100.0 | 100.0 | 100.0 | 100.0 |

The abbreviations in Table 1 are as follows.

PPG-1000: polypropylene glycol (manufactured by Mitsui Chemicals Polyurethanes Co., Ltd., having a number average molecular weight of about 1,000, a hydroxyl value of 112 mgKOH/g, and a melt viscosity at 40° C. of 150 mPa·s)

PPG-2000: polypropylene glycol (manufactured by Mitsui Chemicals Polyurethanes Co., Ltd., having a number average molecular weight of about 2,000, a hydroxyl value of 56 mgKOH/g, and a melt viscosity at 40° C. of 150 mPa·s)

Castor oil: refined castor oil (manufactured by ITOH Oil Chemicals Co., Ltd., having a hydroxyl value of 160.5 mgKOH/g, and a melt viscosity at 40° C. of 250 mPa·s)

TEA: triethylamine (manufactured by Daicel Corporation)

DEA: diethylamine (manufactured by Daicel Corporation)

EDP 300: N,N,N',N'-tetrakis(2-hydroxypropyl)ethylenediamine

ED-500: polypropylene glycol ethylenediamine ether

TE-360: tri(1,2-polypropylene glycol)amine

ε-caprolactam: 2-oxohexamethyleneimine (manufactured by Kanto Chemical Co., Inc.)

δ-valerolactam: tetrahydro-2H-pyran-2-one (manufactured by Kanto Chemical Co., Inc.)

β-propiolactone: 2-oxetanone (manufactured by Kanto Chemical Co., Inc.)

OFS-6040: 3-glycidyloxypropyltrimethoxysilane (manufactured by Toray Dow Corning Co., Ltd.)

KBM903: 3-aminopropyltriethoxysilane (manufactured by Shin-Etsu Chemical Co., Ltd.)

TABLE 2

| Table 2 | | | Example 1 | Example 2 | Example 3 | Example 4 | Comparative Example 1 | Comparative Example 2 |
|---|---|---|---|---|---|---|---|---|
| Polyisocyanate compound: X | | A-1 | 100 | 100 | 100 | 100 | 100 | 100 |
| Polyol compound: Y | | B-1 | 70 | | | | | |
| | | B-2 | | 43 | | | | |
| | | B-3 | | | 11 | | | |
| | | B-4 | | | | 82 | | |
| | | B-5 | | | | | 150 | |
| | | B-6 | | | | | | 54 |
| Melt viscosity at 40° C. of (X) (mPa·s) | | | 1500 | 1500 | 1500 | 1500 | 1500 | 1500 |
| Melt viscosity at 40° C. of (Y) (mPa·s) | | | 220 | 137 | 137 | 302 | 147 | 236 |
| Amine value in (X) + (Y) (mgKOH/g) | | | 10.2 | 14.5 | 11.9 | 17.0 | 0 | 16.9 |
| Evaluation results | Production method (1) | Heat seal strength 1 h | 2 | 2 | 2 | 2 | 1 | 1 |
| | | 3 h | 3 | 3 | 3 | 3 | 2 | 2 |
| | | 5 h | 5 | 4 | 4 | 4 | 2 | 2 |
| | | 24 h | 5 | 5 | 5 | 5 | 2 | 2 |
| | | Lamination strength 1 h | 1 | 1 | 1 | 1 | 1 | 1 |
| | | 3 h | 3 | 3 | 3 | 3 | 2 | 2 |
| | | 5 h | 5 | 5 | 5 | 5 | 2 | 2 |
| | | 24 h | 5 | 5 | 5 | 5 | 2 | 2 |
| | Production method (2) | Heat seal strength 1 h | 2 | 2 | 2 | 2 | 1 | 1 |
| | | 3 h | 3 | 3 | 3 | 3 | 2 | 2 |
| | | 5 h | 5 | 4 | 4 | 4 | 2 | 2 |
| | | 24 h | 5 | 5 | 5 | 5 | 2 | 2 |

TABLE 2-continued

| Table 2 | | Example 1 | Example 2 | Example 3 | Example 4 | Comparative Example 1 | Comparative Example 2 |
|---|---|---|---|---|---|---|---|
| Lamination strength | 1 h | 1 | 1 | 1 | 1 | 1 | 1 |
| | 3 h | 3 | 3 | 3 | 3 | 2 | 2 |
| | 5 h | 5 | 5 | 5 | 5 | 2 | 2 |
| | 24 h | 5 | 5 | 5 | 5 | 2 | 2 |

In Table 2, h represents hour(s).

From the above results, it is found that since the adhesive of the present application contains the tertiary amine compound (B) having plural hydroxyl groups and the aliphatic cyclic amide compound (D), both the heat seal strength and the lamination strength can be exhibited early.

In contrast, in Comparative Example 1, the tertiary amine compound (B) having plural hydroxyl groups was not contained, and the heat seal strength and the lamination strength were extremely low.

In Comparative Example 2, only an amine compound having no hydroxyl group was added to a composition, and the heat seal strength and the lamination strength were low as in Comparative Examples 1 and 2.

The invention claimed is:

1. A two component adhesive comprising:
    a polyisocyanate composition (X) containing a polyisocyanate (A); and
    a polyol composition (Y) containing a tertiary amine compound (B) having plural hydroxyl groups, a polyol (C), and an aliphatic cyclic amide compound (D), as essential components,
    wherein the polyisocyanate composition (X) is separately provided from the polyol composition (Y) before use.

2. The two component adhesive according to claim 1, wherein the polyol (C) is a polyester polyol, a polyester urethane polyol, a polyether urethane polyol, a polyether polyol, or a castor oil-based polyol.

3. The two component adhesive according to claim 1, wherein an amine value of the adhesive is in a range of 0.5 to 40 mgKOH/g.

4. The two component adhesive according to claim 1, wherein the aliphatic cyclic amide compound (D) is selected from the group consisting of δ-valerolactam, ε-caprolactam, ω-enanthollactam, η-capryllactam, and β-propiolactam.

5. The two component adhesive according to claim 1, wherein a mass proportion of the polyol composition (Y) when a mass content of the polyisocyanate composition (X) is taken as 100 is in a range of 10 to 150.

* * * * *